United States Patent [19]
Murakami et al.

[11] Patent Number: 5,853,920
[45] Date of Patent: Dec. 29, 1998

[54] METHOD OF MANUFACTURING ZINC-TITANIUM MOTHER ALLOY AND MANGANESE DRY BATTERY

[75] Inventors: Hajime Murakami, Fujisawa; Ryohei Ashihara, Neyagawa; Kohei Kubota, Okegawa; Koichi Sato, Akishima, all of Japan

[73] Assignees: Mitsui Mining & Smelting Co., Ltd., Osaka-fu; Matsushita Electric Industrial Co., Ltd., Tokyo, both of Japan

[21] Appl. No.: 811,910

[22] Filed: Mar. 5, 1997

[30] Foreign Application Priority Data

Mar. 14, 1996 [JP] Japan .................................. 8-057226
Oct. 7, 1996 [JP] Japan .................................. 8-266201

[51] Int. Cl.⁶ ............................. H01M 4/42; C22C 18/00
[52] U.S. Cl. ......................... 429/229; 148/441; 148/705
[58] Field of Search ................................. 148/441, 705; 420/513; 429/229

[56] References Cited

U.S. PATENT DOCUMENTS 2,233,578  3/1941  Boak .................................. 420/513 X
3,707,367  12/1972  Bjorksten et al. ................. 148/441 X
3,753,702  8/1973  Radtke et al. ......................... 148/441
5,312,476  5/1994  Uemura et al. ..................... 429/229 X

FOREIGN PATENT DOCUMENTS 1 081472 A    2/1994   China .
0 688 056 A1  12/1995  European Pat. Off. .
Sho 50-11576  5/1975   Japan .
61-201 743 A  9/1986   Japan .
07094194 A    4/1995   Japan .
07153449 A    6/1995   Japan .

Primary Examiner—Stephen Kalafut
Attorney, Agent, or Firm—Panitch Schwarze Jacobs & Nadel, P.C.

[57] ABSTRACT

The present invention provides a method of manufacturing a zinc-titanium mother alloy and a manganese dry battery having an anode zinc can prepared from the zinc-titanium alloy. The method comprises: adding spongy titanium to molten zinc; and melting the spongy titanium to alloy with the zinc at 500° to 750° C. for 0.5 to 6 hours, thereby to obtain a zinc-titanium alloy which contains 0.001 to 5% by weight of titanium. The anode zinc can prepared from the zinc-titanium mother alloy is substantially free from metallic titanium and intermetallic compounds having the Zn—Ti atomic ratio of not less than ½.

20 Claims, 4 Drawing Sheets

METHOD OF MANUFACTURING ZINC-TITANIUM MOTHER ALLOY AND MANGANESE DRY BATTERY

BACKGROUND OF THE INVENTION

The present invention relates to a method of manufacturing a zinc-titanium mother alloy for preparing a zinc alloy used for high corrosion-resistant zinc plating or an anode zinc can of a dry battery, and also to a manganese dry battery.

In order to enhance the workability and mechanical strength of an anode zinc can of a manganese dry battery and to prevent corrosion of the anode, that is, to prevent self-discharge of the battery, a general procedure adds 0.3 to 0.8% by weight of lead to zinc, which is the primary constituent of the anode zinc can.

Like mercury and cadmium, lead included in waste dry batteries adversely affects the environment, and it is thus urgently required to manufacture anode zinc cans without lead or with a less amount of lead.

As is well known, however, a decrease in the amount of lead or removal of lead from zinc significantly lowers the workability and mechanical strength of the anode zinc can and makes zinc rather corrosive.

There is a known technique of adding a metal, such as manganese, indium, or bismuth, to the zinc alloy in order to solve the above problem regarding corrosion of zinc (for example, Japanese Patent Publication Sho 50-11576).

Compared with the conventional technique of adding lead alone to the zinc alloy, the technique of adding a metal, such as indium or bismuth, to the zinc alloy in order to enhance the corrosion resistance of zinc, however, tends to deteriorate the workability and mechanical strength of the anode zinc can with a decrease in amount of lead.

Addition of titanium to the zinc alloy has been proposed as a technique of solving this problem (Japanese Laid-Open Patent Publication Hei 7-94194 and Hei 7-153449). Although addition of titanium to the zinc alloy improves the workability and mechanical strength of the anode zinc can, a specific or larger amount of titanium worsens the corrosion resistance and discharge performance of the zinc alloy. Some processes applied for addition of Ti cause pit-like corrosion or defectives of manufactured anode zinc cans.

A known method of manufacturing a zinc-titanium mother alloy adds plate-like or button-like titanium to metallic zinc (purity: 99.99% by weight), which has been molten in a graphite crucible at 700° to 750° C., to a specified concentration.

In this known method, the time required for melting titanium is approximately 6 hours in the concentration of 2.0% by weight and 9 hours in the concentration of 5% by weight. It is also required to hold the molten mixture for approximately 20 hours, in order to prevent metallic titanium and intermetallic compounds having the Zn—Ti atomic ratio of not less than ½ from remaining in the resultant alloy mixture.

The conventional method of manufacturing the zinc-titanium mother alloy requires a relatively long time from addition of materials to molten zinc to completion of the alloy (hereinafter referred to as 'melting time') and is accordingly rather costly.

Another problem is that metallic titanium and intermetallic compounds having the Zn—Ti atomic ratio of not less than ½ still remain in the resultant alloy mixture even under such conditions. The remaining metallic titanium and intermetallic compounds cause defectives of the manufactured anode zinc cans.

BRIEF SUMMARY OF THE INVENTION

One object of the present invention is thus to provide a method of manufacturing a zinc-titanium mother alloy, which uses an easily fusible titanium material to shorten the melting time and prevents metallic titanium and intermetallic compounds having the Zn—Ti atomic ratio of not less than ½ from remaining in the resultant alloy mixture.

Another object of the present invention is to provide a manganese dry battery that includes an improved anode zinc can and is free from mercury and cadmium.

Still another object of the present invention is to provide an anode zinc can composed of a zinc alloy having no or a less amount of lead, but maintains the workability and mechanical strength as well as the corrosion resistance equivalent to or better than those of the conventional anode zinc can containing 0.3 to 0.5% by weight of lead.

The present invention provides a method of manufacturing a zinc-titanium mother alloy which comprises zinc as a primary constituent, wherein spongy titanium is used as a titanium material.

In one aspect of the present invention, a method of manufacturing a zinc-titanium mother alloy comprises the steps of:

melting metallic zinc to obtain molten zinc, adding a titanium material to the molten zinc, and melting the titanium material to alloy with the zinc, thereby to obtain a zinc-titanium mother alloy which comprises zinc as a primary constituent.

In a preferred mode of the present invention, the titanium material is spongy titanium and a step of melting the titanium material to alloy with the zinc is performed at a temperature of 500° to 750° C. for 0.5 to 6 hours, thereby to obtain a zinc-titanium mother alloy which contains 0.001 to 5% by weight of titanium.

In another preferred mode of the present invention, the method of manufacturing a zinc-titanium mother alloy further comprises a step of adding at least one element selected from the group consisting of lead, indium, bismuth, and manganese to obtain a zinc-titanium alloy which contains 0.001 to 10% by weight of said element.

The present invention is also directed to a manganese dry battery having an anode zinc can which is composed of the zinc-titanium mother alloy specified as above or a zinc-titanium alloy prepared from the zinc-titanium mother alloy.

The anode zinc can of the present invention is composed of a zinc-titanium alloy that is free from intermetallic compounds $Zn_2Ti$, $ZnTi$, and $ZnTi_2$ as well as a metallic Ti phase.

More specifically, in accordance with one preferable mode of the present invention, the manganese dry battery comprises an anode zinc can of a bottomed cylindrical shape and a cathode mixture which includes manganese dioxide as an active material and is fitted in the anode zinc can via a separator, wherein the anode zinc can contains 0.002 to 0.4% by weight of lead, 0.001 to 0.005% by weight of titanium, and not larger than 50 ppm of iron as an accompanied impurity but is free from intermetallic compounds $Zn_2Ti$, $ZnTi$, and $ZnTi_2$ as well as a metallic Ti phase.

In accordance with another preferable mode of the present invention, the manganese dry battery comprises an anode zinc can of a bottomed cylindrical shape and a cathode mixture which includes manganese dioxide as an active material and is fitted in the anode zinc can via a separator, wherein the anode zinc can contains 0.001 to 0.005% by weight of titanium and not larger than 50 ppm of iron as an accompanied impurity but is free from intermetallic compounds $Zn_2Ti$, $ZnTi$, and $ZnTi_2$ as well as a metallic Ti phase.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
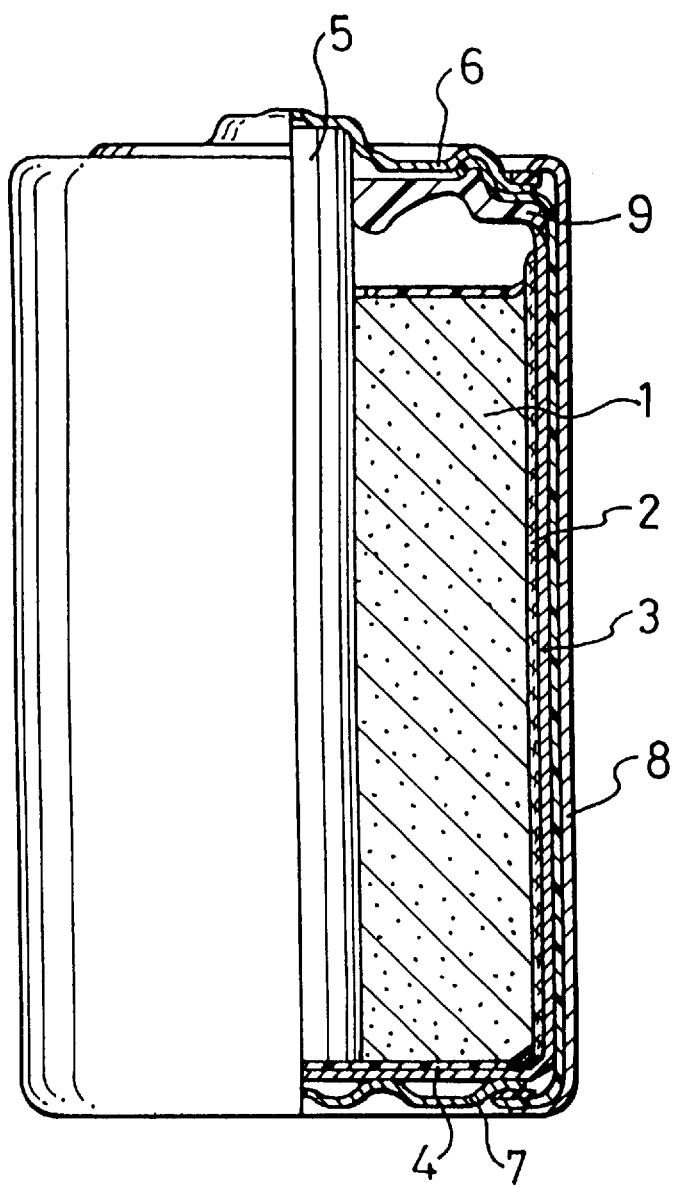
FIG. 1 is a partial cross-sectional view illustrating structure of a cylindrical manganese dry battery according to the present invention.

In the method of the present invention for manufacturing a zinc-titanium mother alloy which includes zinc as a primary constituent, spongy titanium is used as a titanium material.

The spongy titanium is a product specified in JIS 'H2151' and manufactured by magnesium reduction or sodium reduction of titanium tetrachloride.

It is preferable that the content of the spongy titanium is 0.001 to 5% by weight. The content of less than 0.001% by weight undesirably increases the amount of the mother alloy to be added to molten zinc to prepare a zinc-titanium alloy. The content of larger than 5% by weight, on the other hand, is not easily molten and thereby increases the manufacturing cost or causes the impurities, such as metallic titanium, to remain in the resultant alloy mixture. This may result in defectives of the manufactured anode zinc cans.

The preferable temperature for melting the spongy titanium is in a range of 500° to 750° C. The temperature of lower than 500° C. makes it difficult to melt the spongy titanium and thereby causes the non-molten spongy titanium as well as impurities, such as metallic titanium, to remain in the resultant alloy mixture. The temperature of higher than 750° C., on the other hand, causes vaporization of zinc and may thereby lead to application of an injection process of an inert gas. Even when such injection process is not applied, since titanium is easily oxidized, production of oxides is enhanced and nitrogen is incorporated into titanium. This causes the impurities, such as metallic titanium to remain in the resultant alloy mixture.

The preferable melting time ranges 0.5 to 6 hours. The melting time of shorter than 0.5 hours undesirably causes the non-molten spongy titanium as well as impurities, such as metallic titanium, to remain in the resultant alloy mixture. The melting time of longer than 6 hours, on the other hand, enhances production of oxides and thereby undesirably increases the impurities, such as metallic titanium and intermetallic compounds $Zn_2Ti$, $ZnTi$, and $ZnTi_2$.

Vigorous stirring in the melting process is recommended to prevent oxidation of the spongy titanium added to the molten zinc. Metals, such as lead, indium, bismuth, and manganese, may be added to the mother alloy according to the requirements.

The zinc-titanium mother alloy is manufactured by appropriately setting the conditions including the temperature for melting the spongy titanium and the content of the spongy titanium used as the titanium material and the melting time as specified above. Microscopic observation of a vertical section of a cylindrical ingot of $\phi 10 \times 500$ mm prepared in the above manner and cut in parallel to the central axis thereof shows that the total of the metallic titanium phase and the intermetallic compounds $Zn_2Ti$, $ZnTi$, and $ZnTi_2$ remaining as impurities in the zinc-titanium mother alloy is not larger than 40 per 10 $cm^2$ and that the content of iron is not higher than 0.1% by weight.

The defectives of the manufactured anode zinc cans can be eliminated by utilizing the zinc-titanium mother alloy that is manufactured by adding the spongy titanium under the above conditions.

The mother alloy of the present invention may be added effectively to the zinc alloy used for high corrosion-resistant zinc plating other than for the anode zinc can of the dry battery.

The following describes the zinc alloy constituting the anode zinc can of the manganese dry battery of the present invention.

The zinc alloy constituting the anode zinc can contains 0.001 to 0.005% by weight of titanium and not larger than 50 ppm of iron as the accompanied impurity.

It is preferable that the anode zinc can contains at least one selected from the group consisting of 0.001 to 0.05% by weight of indium and 0.001 to 0.05% by weight of bismuth.

It is also preferable that the content of iron included in the anode zinc can as the accompanied impurity is not larger than 15 ppm.

Titanium in the zinc alloy mainly improves the rolling ductilities and the mechanical strength of the alloy with an increase in its content. Addition of titanium larger than a specific amount, however, lowers the corrosion resistance of the alloy and causes abnormal discharge in a certain discharge system.

Indium and bismuth improve the corrosion resistance of the alloy with an increase in their contents, but worsen the rolling ductilities of the alloy.

Lead significantly improves both the rolling ductilities and the corrosion resistance with an increase in its content, and addition of lead less than 1.0% by weight further improves the mechanical strength. A decrease in content of lead enhances the degree of effect of iron included in the zinc alloy of the anode zinc can as the accompanied impurity on the corrosion resistance.

It is impossible to make titanium contained in the zinc alloy of the anode zinc can by directly immersing metallic titanium in molten zinc. This is because the melting point of titanium is significantly higher than the temperature of molten zinc. The method generally applied under such conditions is to prepare the mother alloy and immerse the mother alloy in molten zinc as discussed previously.

As a test, zinc-titanium mother alloys containing titanium in various concentrations have been added to the molten zinc. The titanium concentration of not lower than 8% by weight is not preferable since it takes at least 30 minutes to melt titanium in molten zinc, the amount of titanium in molten zinc can not be controlled during the melting process, and there is a large oxidation loss of titanium in the melting process. The lower concentration of titanium contained in the mother alloy makes the addition to the molten zinc easier, but the required amount of the mother alloy increases to attain the target content, which is economically disadvantageous.

In the present invention, the concentration of titanium contained in the zinc-titanium mother alloy is accordingly not higher than 8% by weight and preferably 0.5 to 5% by weight.

The inventors have also found that the manufacturing conditions of the zinc-titanium mother alloy affects the ratio of defectives of the manufactured anode zinc cans. While a variety of intermetallic compounds of zinc and titanium are produced, those having the high Ti ratio, such as $Zn_2Ti$, $ZnTi$, and $ZnTi_2$, have the melting points higher than 650° C., and are not readily molten in molten zinc but remain. This may result in defectives of the manufactured anode zinc cans. A similar problem arises when the mother alloy is contaminated with metallic titanium.

The inventors have extensively examined the manufacturing conditions of the zinc-titanium mother alloy, and found that the zinc-titanium mother alloy manufactured under the specific conditions does not contain any harmful intermetallic compounds of the high titanium ratio or metallic titanium or otherwise contains only a little amount of fine particles of such compounds and metallic titanium which do not adversely affect the manufacture of the anode zinc cans. The specific conditions are that spongy titanium is used as the titanium material, the content of the spongy titanium is 0.001 to 5% by weight, the temperature for melting the spongy titanium is 500° to 750° C., and the time required for manufacturing the zinc-titanium mother alloy is 0.5 to 6 hours.

The anode zinc can of the present invention composed of the zinc alloy containing a decreased amount of lead has the workability and the mechanical strength equivalent to or better than those of the conventional anode zinc can composed of the zinc alloy containing 0.3 to 0.5% by weight of lead. This anode zinc can of the present invention also exerts the similar or better effects on corrosion resistance of zinc. The anode zinc can of the present invention containing no lead has the workability and the mechanical strength equivalent to those of the conventional anode zinc can composed of the zinc alloy containing 0.3 to 0.5% by weight of lead. This anode zinc can of the present invention also exerts the similar effects on corrosion resistance of zinc.

Some examples of the present invention are discussed below.

EXAMPLES 1 to 16

A zinc ingot (purity: 99.99% by weight) according to the specification of JIS 'H2107' was placed in a graphite crucible No. 30 and molten at 650° C. in an electric furnace. Spongy titanium was added to molten zinc to concentrations of 0.5% by weight, 1.0% by weight, 2.0% by weight, and 3.0% by weight.

Each molten mixture was cast into an ingot case of φ10×500 mm when the melting time of 0.5 hours, 1 hour, 2 hours, or 4 hours had elapsed after the addition of the spongy titanium.

The vertical section of each cylindrical ingot thus obtained and cut in parallel to the central axis thereof was observed with a microscope, and the total number of the remaining metallic titanium and undesirable intermetallic compounds per 10 $cm^2$ was counted. The results of measurement are shown in Table 1.

COMPARATIVE EXAMPLES 1 to 3

A zinc ingot (purity: 99.99% by weight) according to the specification of JIS 'H2107' was placed in a graphite crucible No. 30 and molten at 650° C. in an electric furnace. Spongy titanium was added to molten zinc to a concentration of 6.0% by weight.

Each molten mixture was cast into an ingot case of φ10×500 mm when the melting time of 4 hours, 16 hours, or 24 hours had elapsed after the addition of the spongy titanium.

The vertical section of each cylindrical ingot thus obtained was observed with a microscope, and the total number of the remaining metallic titanium and undesirable intermetallic compounds per 10 $cm^2$ was counted. The results of measurement are shown in Table 2.

CONVENTIONAL EXAMPLES 1 to 9

A zinc ingot (purity: 99.99% by weight) according to the specification of JIS 'H2107' was placed in a graphite crucible No. 30 and molten at 750° C. in an electric furnace. Plate-like or button-like titanium was added to molten zinc to concentrations of 1.0% by weight, 2.0% by weight, and 5.0% by weight.

Each molten mixture was cast into an ingot case of φ10×500 mm when the melting time of 4 hours, 8 hours, or 24 hours had elapsed after the addition of the spongy titanium.

The vertical section of each cylindrical ingot thus obtained was observed with a microscope, and the total number of the remaining metallic titanium and undesirable intermetallic compounds per 10 $cm^2$ was counted. The results of measurement are shown in Table 2.

TABLE 1

| | Manufacturing conditions | | Total number of remaining metal |
|---|---|---|---|
| | Concentration (wt %) | Melting time (hr) | Ti and others per 10 $cm^2$ |
| Example 1 | 0.5 | 0.5 | 0 to 1 |
| Example 2 | 0.5 | 1 | 0 to 1 |
| Example 3 | 0.5 | 2 | 0 |
| Example 4 | 0.5 | 4 | 0 |
| Example 5 | 1.0 | 0.5 | 0 to 2 |
| Example 6 | 1.0 | 1 | 0 to 1 |
| Example 7 | 1.0 | 2 | 0 |
| Example 8 | 1.0 | 4 | 0 |
| Example 9 | 2.0 | 0.5 | 0 to 2 |
| Example 10 | 2.0 | 1 | 0 to 1 |
| Example 11 | 2.0 | 2 | 0 |
| Example 12 | 2.0 | 4 | 0 |
| Example 13 | 3.0 | 0.5 | 0 to 3 |
| Example 14 | 3.0 | 1 | 0 to 2 |
| Example 15 | 3.0 | 2 | 0 to 1 |
| Example 16 | 3.0 | 4 | <5 |

TABLE 2

| | Manufacturing conditions | | Total number of remaining metal |
|---|---|---|---|
| | Concentration (wt %) | Melting time (hr) | Ti and others per 10 cm² |
| Comparative Example 1 | 6.0 | 4 | Non-molten portion observed |
| Comparative Example 2 | 6.0 | 16 | >100 |
| Comparative Example 3 | 6.0 | 24 | 50 to 60 |
| Conventional Example 1 | 1.0 | 4 | >100 |
| Conventional Example 2 | 1.0 | 16 | 80 to 100 |
| Conventional Example 3 | 1.0 | 24 | 40 to 50 |
| Conventional Example 4 | 2.0 | 4 | Non-molten portion observed |
| Conventional Example 5 | 2.0 | 8 | 90 to 100 |
| Conventional Example 6 | 2.0 | 24 | 50 to 60 |
| Conventional Example 7 | 5.0 | 4 | Non-molten portion observed |
| Conventional Example 8 | 5.0 | 8 | Non-molten portion observed |
| Conventional Example 9 | 5.0 | 24 | 70 to 80 |

As clearly shown in Tables 1 and 2, the method of the present invention gives the zinc-titanium mother alloy that is substantially not contaminated with metallic titanium or undesirable intermetallic compounds.

EXAMPLE 17

The zinc alloys used in the samples No. 1 to No. 66 specified below were prepared in the following manner. A predetermined amount of zinc (purity: 99.99% by weight) was molten in a graphite crucible and kept at 450° C. Flakes of lead, indium, and bismuth were added to the molten zinc in this sequence by the amounts calculated as the addition yield of 100% by weight with respect to the target composition and stirred until being completely molten. Titanium in the form of flakes of the mother alloy of zinc-titanium (3% by weight) was then added to the molten mixture by the amount calculated as the addition yield of 95% by weight with respect to the target composition and stirred until being completely molten. After the titanium mother alloy was molten, dross on the surface was removed carefully. The molten mixture kept at 450° C. was then cast into a die to yield a plate of 300 mm in width, 1,500 mm in length, and 10 mm in thickness. The plate was rolled out at 200° C. to a thickness of 5 mm.

The compositions of the zinc alloys thus obtained are shown in Tables 3 to 5.

The surface of each sample was observed for evaluation of the rolling ductilities. The rolled plate was pressed to circular pieces of a predetermined size. The circular pieces were molded into an anode zinc can for a manganese dry battery of R20 size by impact molding process.

The mechanical strength of the anode zinc can thus manufactured to have each composition was measured by the method discussed below.

Figure 2:
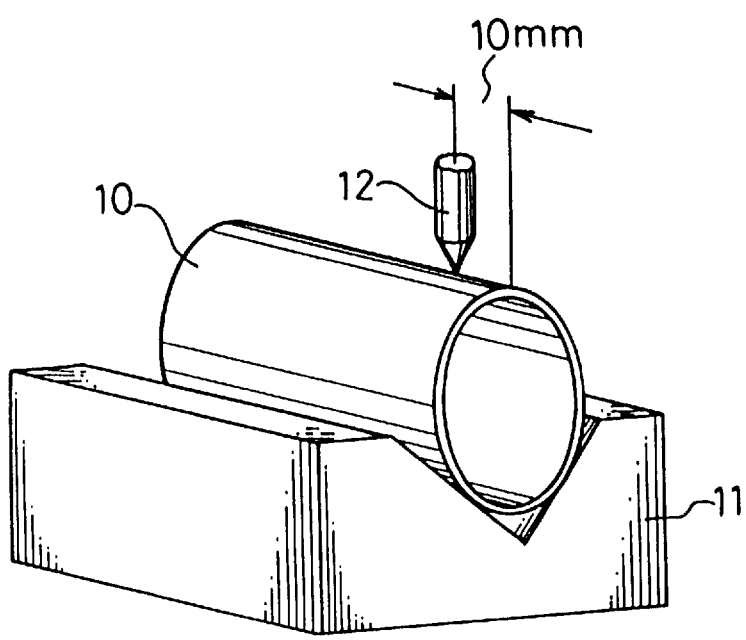
FIG. 2 shows a method of measuring the mechanical strength of anode zinc cans given as examples of the present invention.

Referring to FIG. 2, an anode zinc can 10 of each composition was placed in a V block 11, and a cone-shaped element 12 was then pressed against a certain point on the anode zinc can 10, which was 10 mm apart from the opening of the anode zinc can 10. The displacement of the certain point in the moving direction of the element 12 and the force applied at this point were measured with a recorder. The anode zinc cans of the R20 size tested here showed a substantially constant displacement of approximately 4 mm. As a matter of convenience, the force applied at the measuring point under the condition of the 4 mm-displacement was regarded as the mechanical strength of each anode zinc can.

In order to evaluate the corrosion resistance of each anode zinc can, the hydrogen gas evolution test was carried out in an electrolyte. In the hydrogen gas evolution test, each anode zinc can cut to a predetermined weight was immersed at 45° C. in 5 ml of the electrolyte containing 30% by weight of zinc chloride and not larger than 1.9% by weight of ammonium chloride and the amount of the evolved gas was measured for three days.

Tables 3, 4, and 5 show the results of the measurements; that is, the rolling ductilities of each zinc alloy, the mechanical strength of each anode zinc can, and the amount of gas evolved from each anode zinc can. The rolling ductilities were evaluated with the symbols specified below. The amount of the evolved gas in Tables 3 to 5 was the mean value per day.

O: The whole surface of the rolled piece was in a favorable condition.

x: Cracks were observed on the side faces of the rolled piece.

xx: Cracks were observed on the whole surface of the rolled piece, and the plate could not rolled out to the predetermined thickness.

TABLE 3

| Sample | Added metals and their contents in zinc alloy (ppm only for Fe and wt % for others) | | | | | | | |
|---|---|---|---|---|---|---|---|---|
| No. | Pb | In | Bi | Ti | Fe | *1 | *2 | *3 |
| 1 | 0.20 | 0.0005 | 0 | 0.003 | 30 | o | 4.1 | 90 |
| 2 | 0.20 | 0.001 | 0 | 0.003 | 30 | o | 4.2 | 62 |
| 3 | 0.20 | 0.01 | 0 | 0.003 | 30 | o | 4.3 | 47 |
| 4 | 0.20 | 0.05 | 0 | 0.003 | 30 | o | 4.3 | 33 |
| 5 | 0.20 | 0.1 | 0 | 0.003 | 30 | x | 4.3 | 31 |
| 6 | 0.20 | 0.05 | 0 | 0 | 30 | xx | — | — |
| 7 | 0.20 | 0.01 | 0 | 0.0005 | 30 | o | 2.8 | 27 |
| 8 | 0.20 | 0.01 | 0 | 0.001 | 30 | o | 3.5 | 29 |
| 9 | 0.20 | 0.01 | 0 | 0.005 | 30 | o | 4.2 | 32 |
| 10 | 0.20 | 0.01 | 0 | 0.01 | 30 | o | 4.5 | 38 |
| 11 | 0.40 | 0.01 | 0 | 0.003 | 30 | o | 4.5 | 30 |
| 12 | 0.02 | 0.01 | 0 | 0.003 | 30 | o | 4.1 | 46 |
| 13 | 0 | 0.0005 | 0 | 0.003 | 30 | o | 3.8 | 107 |
| 14 | 0 | 0.001 | 0 | 0.003 | 30 | o | 3.8 | 68 |
| 15 | 0 | 0.01 | 0 | 0.003 | 30 | o | 3.9 | 54 |
| 16 | 0 | 0.05 | 0 | 0.003 | 30 | o | 3.9 | 37 |
| 17 | 0 | 0.1 | 0 | 0.003 | 30 | x | 3.9 | 36 |

*1 Rolling ductility of the zinc alloy
*2 Strength of the anode can (kg · f)
*3 Gas amount generated during storing at 45° C. ($\mu$l/g · day)

TABLE 4

| Sample | Added metals and their contents in zinc alloy (ppm only for Fe and wt % for others) | | | | | | | |
|---|---|---|---|---|---|---|---|---|
| No. | Pb | In | Bi | Ti | Fe | *1 | *2 | *3 |
| 18 | 0 | 0.01 | 0 | 0.0005 | 30 | o | 2.7 | 49 |
| 19 | 0 | 0.01 | 0 | 0.001 | 30 | o | 3.1 | 50 |

TABLE 4-continued

| Sample No. | Added metals and their contents in zinc alloy (ppm only for Fe and wt % for others) | | | | | *1 | *2 | *3 |
|---|---|---|---|---|---|---|---|---|
| | Pb | In | Bi | Ti | Fe | | | |
| 20 | 0 | 0.01 | 0 | 0.005 | 30 | o | 3.6 | 53 |
| 21 | 0 | 0.01 | 0 | 0.01 | 30 | o | 3.8 | 52 |
| 22 | 0.20 | 0 | 0.0005 | 0.003 | 30 | o | 3.9 | 93 |
| 23 | 0.20 | 0 | 0.001 | 0.003 | 30 | o | 3.9 | 68 |
| 24 | 0.20 | 0 | 0.05 | 0.003 | 30 | o | 4.0 | 38 |
| 25 | 0.20 | 0 | 0.1 | 0.003 | 30 | x | 4.2 | 34 |
| 26 | 0.20 | 0 | 0.05 | 0 | 30 | xx | — | — |
| 27 | 0.20 | 0 | 0.01 | 0.0005 | 30 | xx | — | — |
| 28 | 0.20 | 0 | 0.01 | 0.001 | 30 | o | 3.4 | 39 |
| 29 | 0.20 | 0 | 0.01 | 0.005 | 30 | o | 3.9 | 38 |
| 30 | 0.20 | 0 | 0.01 | 0.01 | 30 | o | 4.1 | 41 |
| 31 | 0.40 | 0 | 0.01 | 0.003 | 30 | o | 4.0 | 33 |
| 32 | 0.02 | 0 | 0.01 | 0.003 | 30 | o | 3.3 | 40 |
| 33 | 0 | 0 | 0.0005 | 0.003 | 30 | o | 3.7 | 110 |
| 34 | 0 | 0 | 0.001 | 0.003 | 30 | o | 3.7 | 62 |
| 35 | 0 | 0 | 0.005 | 0.003 | 30 | o | 3.7 | 59 |
| 36 | 0 | 0 | 0.01 | 0.003 | 30 | o | 3.7 | 57 |
| 37 | 0 | 0 | 0.05 | 0.003 | 30 | o | 3.8 | 53 |
| 38 | 0 | 0 | 0.1 | 0.003 | 30 | x | 4.0 | 46 |

*1 Rolling ductility of the zinc alloy
*2 Strength of the anode can (kg · f)
*3 Gas amount generated during storing at 45° C. (μl/g · day)

TABLE 5

| Sample No. | Added metals and their contents in zinc alloy (ppm only for Fe and wt % for others) | | | | | *1 | *2 | *3 |
|---|---|---|---|---|---|---|---|---|
| | Pb | In | Bi | Ti | Fe | | | |
| 39 | 0 | 0 | 0.01 | 0.0005 | 30 | x | 2.1 | 58 |
| 40 | 0 | 0 | 0.01 | 0.001 | 30 | o | 3.1 | 61 |
| 41 | 0 | 0 | 0.01 | 0.005 | 30 | o | 3.6 | 65 |
| 42 | 0 | 0 | 0.01 | 0.01 | 30 | o | 3.9 | 64 |
| 43 | 0 | 0.01 | 0.01 | 0.003 | 30 | o | 3.8 | 38 |
| 44 | 0.02 | 0.01 | 0.01 | 0.003 | 30 | o | 3.9 | 32 |
| 45 | 0.40 | 0.05 | 0.05 | 0.003 | 30 | o | 4.3 | 28 |
| 46 | 0.20 | 0.05 | 0.05 | 0.003 | 30 | o | 4.1 | 30 |
| 47 | 0 | 0.05 | 0.05 | 0.003 | 30 | o | 3.8 | 38 |
| 48 | 0.20 | 0.01 | 0 | 0.003 | 15 | o | 4.2 | 23 |
| 49 | 0.20 | 0.01 | 0 | 0.003 | 50 | o | 4.2 | 48 |
| 50 | 0.20 | 0.01 | 0 | 0.003 | 60 | o | 4.3 | 71 |
| 51 | 0.20 | 0.01 | 0 | 0.003 | 100 | o | 4.1 | 106 |
| 52 | 0 | 0.01 | 0 | 0.003 | 15 | o | 3.8 | 38 |
| 53 | 0 | 0.01 | 0 | 0.003 | 50 | o | 3.9 | 68 |
| 54 | 0 | 0.01 | 0 | 0.003 | 60 | o | 3.8 | 88 |
| 55 | 0 | 0.01 | 0 | 0.003 | 100 | o | 4.0 | 155 |
| 67 | 0 | 0 | 0 | 0 | 30 | o | 0.9 | 101 |
| 68 | 0.20 | 0 | 0 | 0 | 30 | o | 2.0 | 82 |
| 69 | 0.40 | 0 | 0 | 0 | 30 | o | 2.8 | 67 |

*1 Rolling ductility of the zinc alloy
*2 Strength of the anode can (kg · f)
*3 Gas amount generated during storing at 45° C. (μl/g · day)

The samples No. 7 to No. 10 and No. 18 to No. 21 show that addition of titanium to the zinc alloy containing indium alone or both indium and lead improves the mechanical strength of the anode zinc can. The samples No. 27 to No. 30 and No. 39 to No. 42 show that addition of titanium to the zinc alloy containing bismuth alone or both bismuth and lead improves the mechanical strength of the anode zinc can.

The samples No. 1 to No. 5 and No. 13 to No. 17 show that addition of indium to the zinc alloy containing titanium depresses evolution of hydrogen gas. The samples No. 22 to No. 25 and No. 33 to No. 38 show that addition of bismuth to the zinc alloy containing titanium depresses evolution of hydrogen gas.

The samples No. 4 to No. 6 and No. 24 to No. 26 show that addition of titanium improves the rolling ductilities and that the effect of addition of titanium on the improvement in rolling ductilities is weakened when the content of indium or bismuth alone exceeds 0.1% by weight.

The results show that the anode zinc cans containing 0.001 to 0.005% by weight of titanium and 0.001 to 0.05% by weight of indium or 0.001 to 0.05% by weight of bismuth maintain the preferable rolling ductilities and have the mechanical strength and the effect of depressing the gas evolution equivalent to or better than those of the sample No. 69 given as the conventional example and containing 0.4% by weight of lead.

The less contents undesirably make the resultant zinc alloy soft, whereas the larger contents make the resultant zinc alloy brittle and cause cracks in the process of rolling out the zinc alloy. The contents out of the above ranges also lead to another problem; that is, the evolved gas prevents the practical discharge performance from being maintained in the battery stored.

Comparison between the zinc alloy containing lead and that without lead shows that the zinc alloy without lead has a little poorer effect of depressing evolution of the hydrogen gas, which is, however, equivalent to or better than that of the sample No. 69 given as the conventional example, and has the mechanical strength better than that of the sample No. 69.

The results of the samples No. 43 to No. 47 show that zinc alloys containing both indium and bismuth have the improved effect of depressing evolution of the hydrogen gas, compared with those containing only indium or bismuth. The zinc alloy containing both 0.05% by weight of indium and bismuth showed the favorable rolling ductilities.

As is well known, the content of iron included in the zinc alloy as the accompanied impurity significantly affects the corrosion resistance of the anode zinc can. It is accordingly important to regulate the content of iron in the zinc alloy as well as to add the metals, such as indium and bismuth, which improve the corrosion resistance, while the content of lead in the zinc alloy of the anode zinc can is decreased.

The samples No. 48, No. 3, and No. 49 to No. 51 were used to evaluate the effect of the content of iron on corrosion resistance of the anode zinc can, when the content of lead in the zinc alloy was decreased. The amount of the evolved gas increased when the content of iron in the zinc alloy exceeded 50 ppm.

It is accordingly preferable that the content of iron included in the zinc alloy as the accompanied impurity is not larger than 50 ppm when the content of lead in the zinc alloy of the anode zinc can is decreased.

The content of iron that is not larger than 15 ppm further improves the corrosion resistance.

The results of the samples No. 52, No. 15, and No. 53 to No. 55 show that the effect of iron is more significant when the zinc alloy does not contain any lead.

These results show that the anode zinc cans containing the respective elements in the specified ranges maintain the workability and mechanical strength as well as the corrosion resistance equivalent to or better than those of the conventional anode zinc can containing 0.3 to 0.5% by weight of lead.

The following describes the relationship between the content of titanium and the performance of the battery.

Addition of titanium of not less than 0.01% by weight causes abnormal discharge in the course of light-load intermittent discharge.

The discharge test was carried out for manganese dry batteries of R20 size having the construction shown in FIG.

1, according to the specification of the JIS standard; that is, the resistance of 39 Ω as the load and the cycle of 4 hour-discharge and 20 hour-rest.

Each manganese dry battery tested had the structure shown in FIG. 1. A cathode mixture 1 including manganese dioxide as an active material was inserted into an anode zinc can 3 of a bottomed cylindrical shape via a separator 2. A carbon rod 5 functioning as the cathode collector was inserted into the center of the cathode mixture 1. A bottom insulator paper 4 is placed on the bottom of the anode zinc can 3. The upper opening of the anode zinc can 3 was sealed with a plastic sealing member 9. The manganese dry battery also includes a sealing cap plate 6 functioning as the cathode terminal, an anode terminal plate 7, and an outer jacket 8.

Figure 3:
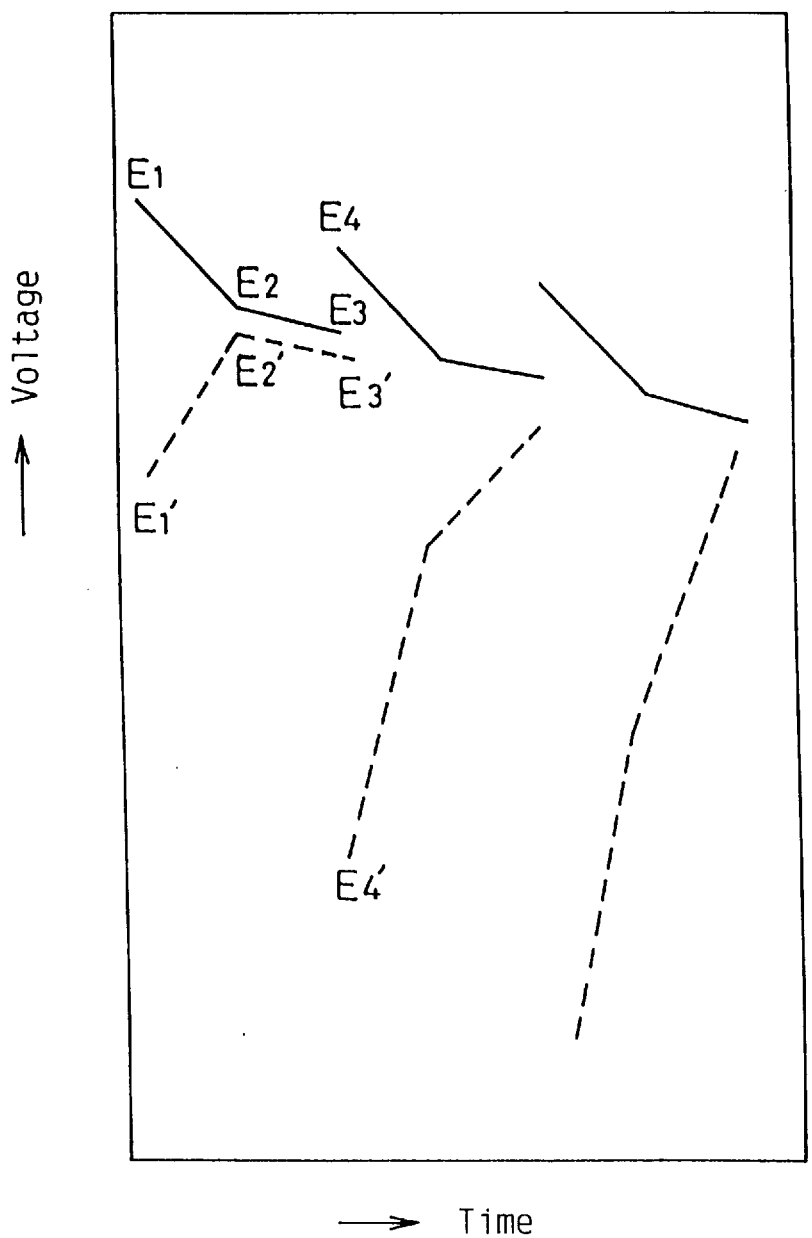
FIG. 3 is a graph showing intermittent discharge curves of a manganese dry battery, which are used to explain abnormal discharge.

The solid lines in FIG. 3 represent a typical intermittent discharge curve of a general manganese dry battery. E1, E2, and E3 respectively denote the voltages of the battery immediately after the start of discharging, after two hours, and immediately before the termination of discharging. E4 denotes the voltage of the battery immediately after the re-start of discharging after the 20 hour-rest.

Referring to the graph of FIG. 3, the voltage of the battery decreases from E1, E2 to E3 with a progress of discharging, and the voltage E4 after the 20 hour-rest is returned to the level higher than the voltage E3.

In case that the content of titanium in the anode zinc can is not less than 0.006% by weight as specified in Table 6, a voltage E4' immediately after the re-start of discharging after the 20 hour-rest becomes lower than a voltage E3' immediately before the termination of the previous discharging as shown by the broken lines in FIG. 3.

TABLE 6

| Sample No. | Added metals and their contests (wt %) | | | Duration of intermittent discharge with 39 Ω load (hr) | Occurrence of abnormal discharge |
| --- | --- | --- | --- | --- | --- |
| | In | Bi | Ti | | |
| 18 | 0.01 | 0 | 0.0005 | 290 | No |
| 19 | 0.01 | 0 | 0.001 | 292 | No |
| 56 | 0.01 | 0 | 0.002 | 287 | No |
| 57 | 0.01 | 0 | 0.003 | 291 | No |
| 58 | 0.01 | 0 | 0.004 | 289 | No |
| 59 | 0.01 | 0 | 0.005 | 290 | No |
| 60 | 0.01 | 0 | 0.006 | 288 | Yes |
| 61 | 0.01 | 0 | 0.007 | 292 | Yes |
| 62 | 0.01 | 0 | 0.01 | 254 | Yes |
| 63 | 0.01 | 0 | 0.05 | 157 | Yes |
| 64 | 0 | 0.01 | 0.001 | 290 | No |
| 65 | 0 | 0.01 | 0.005 | 289 | No |
| 66 | 0 | 0.01 | 0.006 | 289 | Yes |

The abnormal discharge, in which the voltage he rest is not returned but decreases, is table to the substance that is generated on the of the zinc can and prevents the conduction of electricity.

Figure 4:
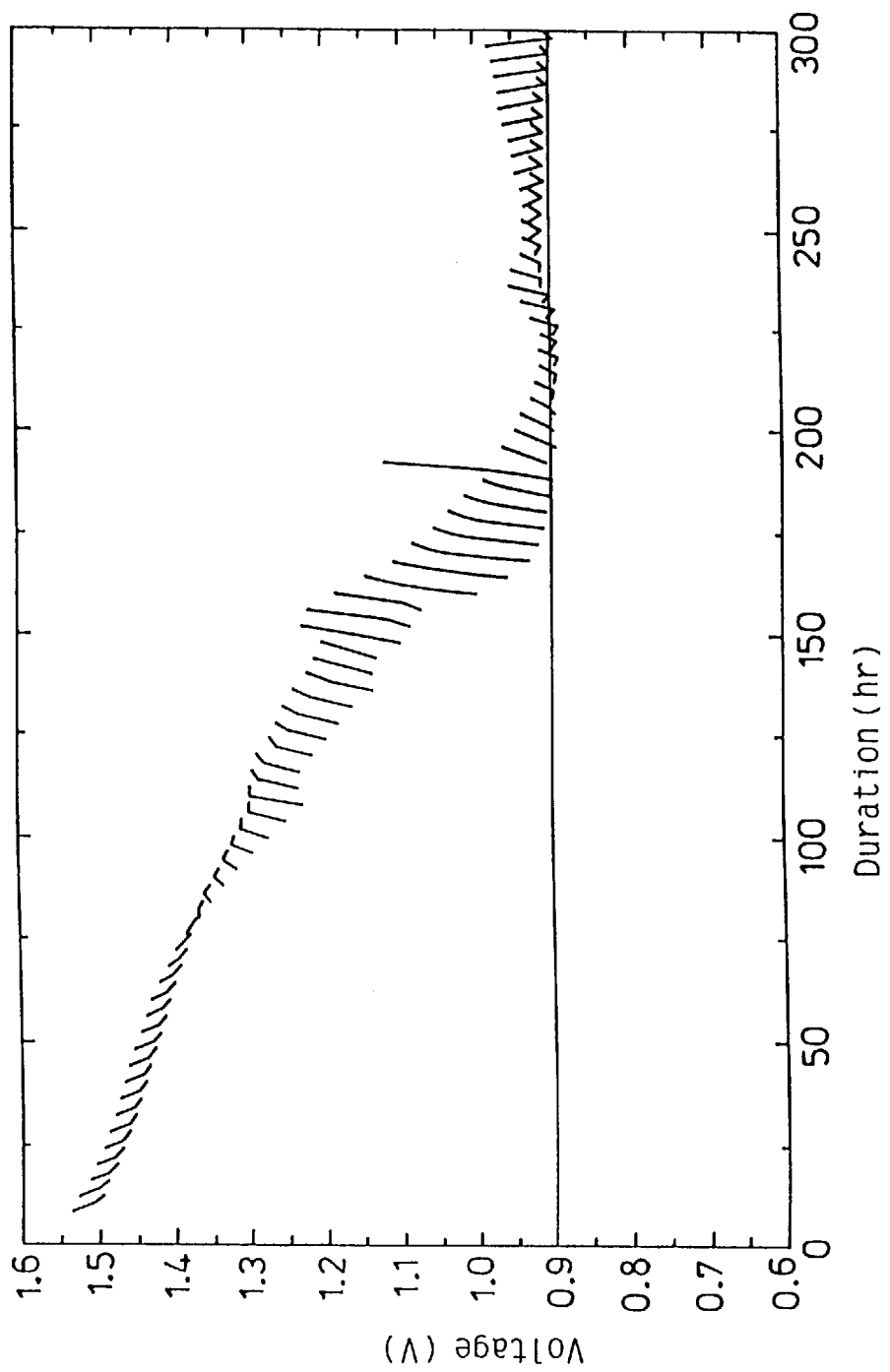
FIG. 4 is a graph illustrating a typical intermittent discharge curve of a dry battery showing abnormal discharge.

A large decrease of the voltage E4' results in the extremely short duration as the sample No. 63. FIG. 4 shows an example of such abnormal discharge.

This phenomenon is observed when the sample contains the large amount of titanium. No abnormal discharge is observed when the content of titanium is not larger than 0.005% by weight as shown by the samples No. 18, No. 19, No. 56 to No. 59, No. 64, and No. 65 in Table 6. Abnormal discharge occurs when the content of titanium is not less than 0.006% by weight as shown by the samples No. 60 to No. 63 and No. 66.

Although the above examples regard the Zn—Ti—In alloy and Zn—Ti—Bi alloy, the Zn—Ti—In—Bi alloy and these alloys further including lead have the similar behaviors.

The zinc-titanium mother alloy without intermetallic compounds $Zn_2Ti$, $ZnTi$, and $ZnTi_2$ as well as a metallic Ti phase was processed to cans by the two different methods.

The process A used spongy titanium as the titanium material and adopted the optimum manufacturing conditions; that is, the content of the spongy titanium was 0.001 to 5% by weight, the temperature for melting the spongy titanium was 500° to 750° C., and the melting time was 0.5 to 6 hours. The process B was the comparative example.

Process A

Metallic zinc (purity: 99.99% by weight) according to the specification of JIS 'H2107' was placed in a graphite crucible No. 30 and molten at 650° C. in an electric furnace, and spongy titanium was then added to molten zinc to the concentration of 2.0% by weight. The molten mixture was cast into an ingot case of φ10×500 mm after the melting time of 4 hours. The resultant ingot was used as the titanium mother alloy.

Process B

Metallic zinc (purity: 99.99% by weight) according to the specification of JIS 'H2107' was placed in a graphite crucible No. 30 and molten at 750° C. in an electric furnace, and plate-like or button-like titanium was then added to molten zinc to the concentration of 2.0% by weight. The molten mixture was cast into an ingot case of φ10×500 mm after the melting time of 24 hours. The resultant ingot was used as the titanium mother alloy.

The alloy samples having the same compositions as those of the samples No. 57, 59, 60, and 62 were prepared from the zinc-titanium mother alloy manufactured according to the process A or the process B. Samples No. 57A, 59A, 60A, and 62A were prepared from the zinc-titanium mother alloy manufactured according to the process A, whereas samples No. 57B, 59B, 60B, and 62B were prepared from the zinc-titanium mother alloy manufactured according to the process B. Table 7 shows the ratio of defectives of the anode zinc cans of the R20 size and the R6 size prepared from these alloys.

TABLE 7

| Sample No. | Number of defective cans in R20 | Number of defective cans in R6 |
| --- | --- | --- |
| 57A | 0/10,000 | 0/10,000 |
| 57B | 28/10,000 | 45/10,000 |
| 59A | 0/10,000 | 0/10,000 |
| 59B | 35/10,000 | 52/10,000 |
| 60A | 0/10,000 | 0/10,000 |
| 60B | 48/10,000 | 67/10,000 |
| 62A | 0/10,000 | 0/10,000 |
| 62B | 97/10,000 | 100/10,000 |

As clearly shown in Table 7, all the anode zinc cans prepared from the alloy manufactured according to the process A had the normal workability, irrespective of their size. In the anode zinc cans prepared from the alloy manufactured according to the process B, on the other hand, the portion having the extremely poor rolling ductilities was found in the process of impact molding the anode zinc cans, and the defectives were found in all such examples at the ratios specified in Table 7.

The abnormal portions of the defective cans prepared from the alloy manufactured according to the process B were observed with an X-ray microanalyzer. The compounds having the high Ti ratio, such as $Zn_2Ti$, $ZnTi$, and $ZnTi_2$, were detected in such abnormal portions.

The above results show that the zinc alloy prepared from the zinc-titanium mother alloy that is manufactured by using spongy titanium as the titanium material and setting the content of the spongy titanium to 0.001 to 5% by weight, the temperature for melting the spongy titanium to 500° to 750° C., and the melting time to 0.5 to 6 hours, has the workability equivalent to that of the conventional zinc alloy containing 0.4% by weight of lead.

The lower limit value 0.002% given as the content of lead represents the content of lead that is inevitably contained in zinc (purity: 99.99% by weight), which is generally used as the material of the anode zinc can for a manganese dry battery.

As discussed above, the method of the present invention shortens the melting time and gives the zinc-titanium mother alloy that is substantially free from metallic titanium and intermetallic compounds having the Zn—Ti atomic ratio of not lower than ½.

The method of the present invention gives a useful manganese dry battery, which has the mechanical strength of the anode zinc can required in the process of manufacturing the battery equivalent to or better than that of the conventional anode zinc can, maintains the effect of corrosion resistance in the stored battery equivalent to or better than that of the conventional anode zinc can, causes no abnormal discharge in the light-load intermittent discharging process, and does not adversely affect the environment.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A method of manufacturing a zinc-titanium mother alloy which comprises zinc as a primary constituent, comprising the step of:

adding to said zinc spongy titanium as a titanium material.

2. An anode zinc can for a manganese dry battery, said anode zinc can having a bottomed cylindrical shape and comprising a zinc-titanium alloy prepared from the zinc-titanium mother alloy manufactured by a method in accordance with claim 1.

3. The anode zinc can according to claim 2, wherein the total of the metallic titanium phase and the intermetallic compounds $Zn_2Ti$, $ZnTi$, and $ZnTi_2$ remaining as impurities in said zinc-titanium mother alloy is not larger than 40 per 10 $cm^2$.

4. A manganese dry battery having an anode zinc can which comprises the zinc-titanium mother alloy manufactured by a method in accordance with claim 1.

5. The method according to claim 1, further comprising the steps of:

melting metallic zinc to obtain molten zinc, adding said spongy titanium to said molten zinc, and melting said spongy titanium to alloy with said zinc.

6. The method according to claim 5, wherein said spongy titanium is added in an amount to obtain said zinc-titanium mother alloy containing 0.001 to 5% by weight titanium.

7. The method according to claim 5, wherein said spongy titanium is melted with said zinc at a temperature of 500° to 750° C. for 0.5 to 6 hours.

8. A method of manufacturing a zinc-titanium mother alloy comprising the steps of:

melting metallic zinc to obtain molten zinc, adding spongy titanium to said molten zinc, and melting said spongy titanium to alloy with said zinc at a temperature of 500° to 750° C. for 0.5 to 6 hours, thereby to obtain a zinc-titanium mother alloy which contains 0.001 to 5% by weight of titanium.

9. The method of manufacturing a zinc-titanium mother alloy in accordance with claim 8, further comprising a step of adding at least one element selected from the group consisting of lead, indium, bismuth, and manganese to obtain a zinc-titanium alloy which contains 0.001 to 10% by weight of said element.

10. An anode zinc can for a manganese dry battery, said anode zinc can having a bottomed cylindrical shape and comprising a zinc-titanium alloy prepared from the zinc-titanium mother alloy manufactured by a method in accordance with claim 8.

11. A manganese dry battery having an anode zinc can which comprises the zinc-titanium mother alloy manufactured by a method in accordance with claim 8.

12. An anode zinc can for a manganese dry battery, said anode zinc can having a bottomed cylindrical shape and being composed of a zinc-titanium alloy that is free from intermetallic compounds $Zn_2Ti$, $ZnTi$, and $ZnTi_2$ as well as a metallic Ti phase.

13. A manganese dry battery comprising the anode zinc can in accordance with claim 12, a cathode mixture which includes manganese dioxide as an active material and is contained in said anode zinc can, and a separator interposed between said anode zinc can and said cathode mixture.

14. A manganese dry battery comprising an anode zinc can of a bottomed cylindrical shape, a cathode mixture which includes manganese dioxide as an active material and is contained in said anode zinc can, and a separator interposed between said anode zinc can and said cathode mixture, wherein said anode zinc can contains 0.002 to 0.4% by weight of lead, 0.001 to 0.005% by weight of titanium, and not larger than 50 ppm of iron as an accompanied impurity but is free from intermetallic compounds $Zn_2Ti$, $ZnTi$, and $ZnTi_2$ as well as a metallic Ti phase.

15. A manganese dry battery in accordance with claim 14, wherein said anode zinc can comprises at least one element selected from the group consisting of 0.001 to 0.05% by weight of indium and 0.001 to 0.05% by weight of bismuth.

16. A manganese dry battery in accordance with claim 15, wherein said anode zinc can contains not larger than 15 ppm of iron as the accompanied impurity.

17. A manganese dry battery in accordance with claim 14, wherein said anode zinc can contains not larger than 15 ppm of iron as the accompanied impurity.

18. A manganese dry battery comprising an anode zinc can of a bottomed cylindrical shape, a cathode mixture which includes manganese dioxide as an active material and is contained in said anode zinc can, and a separator interposed between said anode zinc can and said cathode mixture, wherein said anode zinc can contains 0.001 to 0.005% by weight of titanium and not larger than 50 ppm of iron as an accompanied impurity but is free from intermetallic compounds $Zn_2Ti$, $ZnTi$, and $ZnTi_2$ as well as a metallic Ti phase.

19. A manganese dry battery in accordance with claim 18, wherein said anode zinc can comprises at least one element selected from the group consisting of 0.001 to 0.05% by weight of indium and 0.001 to 0.05% by weight of bismuth.

20. A manganese dry battery in accordance with claim 18, wherein said anode zinc can contains not larger than 15 ppm of iron as the accompanied impurity.

* * * * *